United States Patent

Bonini

[15] 3,688,361
[45] Sept. 5, 1972

[54] METHOD OF MAKING A TRIMMABLE MONOLITHIC CAPACITOR

[72] Inventor: Joseph N. Bonini, Plainfield, N.J. 07062

[73] Assignee: Gulton Industries, Inc., Metuchen, N.J.

[22] Filed: June 18, 1971

[21] Appl. No.: 154,285

Related U.S. Application Data

[62] Division of Ser. No. 3,011, Jan. 15, 1970, Pat. No. 3,586,933.

[52] U.S. Cl. .................29/25.42, 29/593, 317/261
[51] Int. Cl. ..........................................H01g 13/00
[58] Field of Search .....29/25.42, 593; 317/242, 261, 317/249 R

[56] References Cited

UNITED STATES PATENTS

| | | | |
|---|---|---|---|
| 2,526,704 | 10/1950 | Bair | 29/25.42 |
| 3,189,974 | 6/1965 | Fabricius | 29/25.42 |
| 3,391,312 | 7/1968 | Ruffner | 317/261 X |
| 3,496,434 | 2/1970 | Prokopowicz | 317/261 X |
| 3,237,066 | 2/1966 | Martin et al. | 317/261 X |

Primary Examiner—John F. Campbell
Assistant Examiner—Carl E. Hall
Attorney—Sidney Wallenstein et al.

[57] ABSTRACT

Forming a capacitor having an insulating body with a plurality of capacitor forming plates therein defining two groups of capacitor plates with edge portions of one group of plates extending to a margin of the body and interconnected by a terminal, and edge portions of the other group of plates extending to a margin of the body and interconnected by another terminal. Trimming plates are provided opposite one or more plates of said one group of plates and having edge portions extending to a margin of the body in alignment therealong and spaced and insulated from one another and said terminals, each trimming plate when connected to the terminal of said other group of plates adding a small given increment to the value of the overall capacitance of the capacitor. The capacitance between said terminals is measured and, if the capacitance is less than the desired value by an amount which can be added by said trimming plates, the terminal of said other group of plates is extended to contact physically and electrically said edge portions of a number of said trimming plates necessary to obtain the desired capacitance value.

3 Claims, 5 Drawing Figures

PATENTED SEP 5 1972 3,688,361
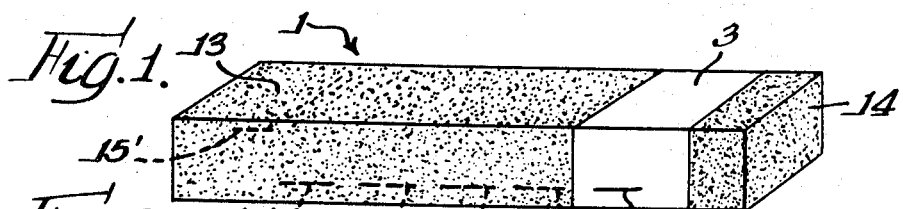
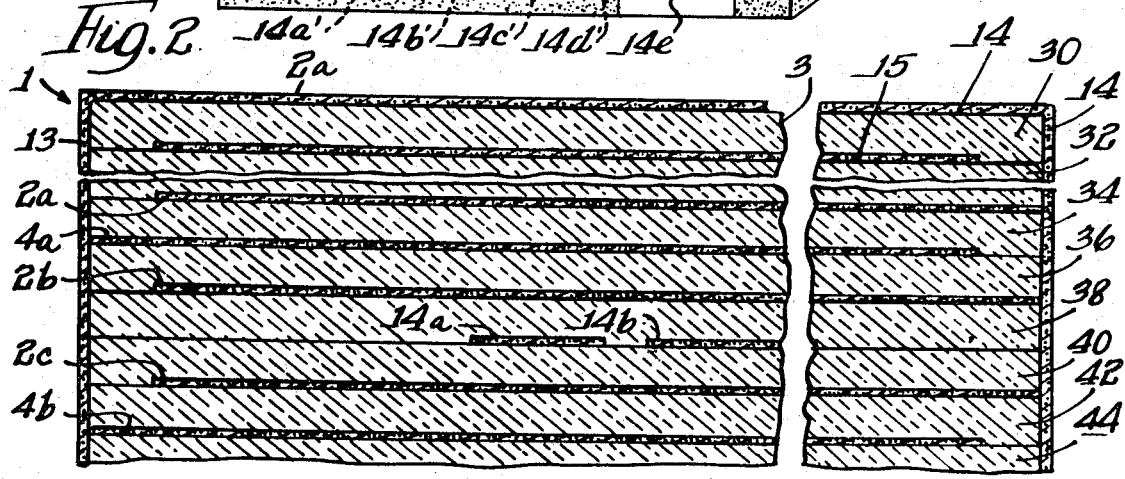
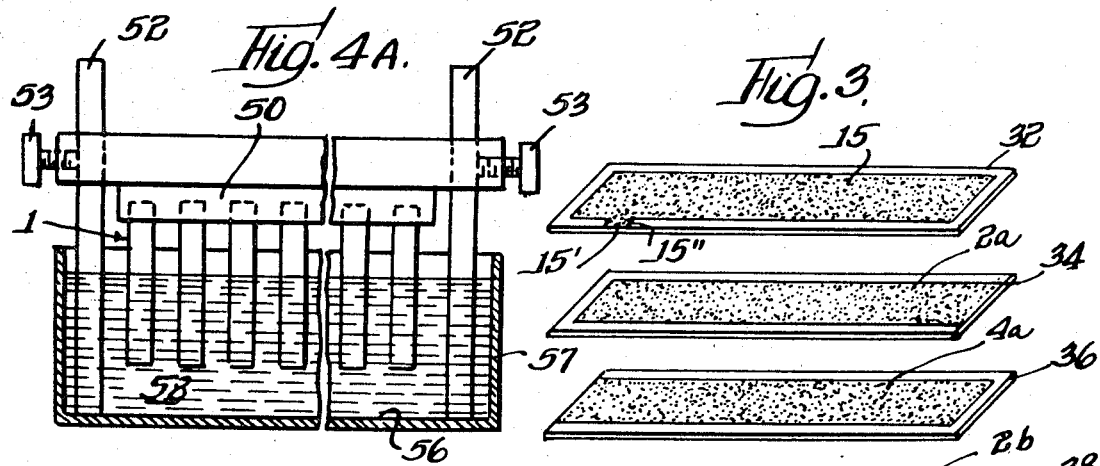
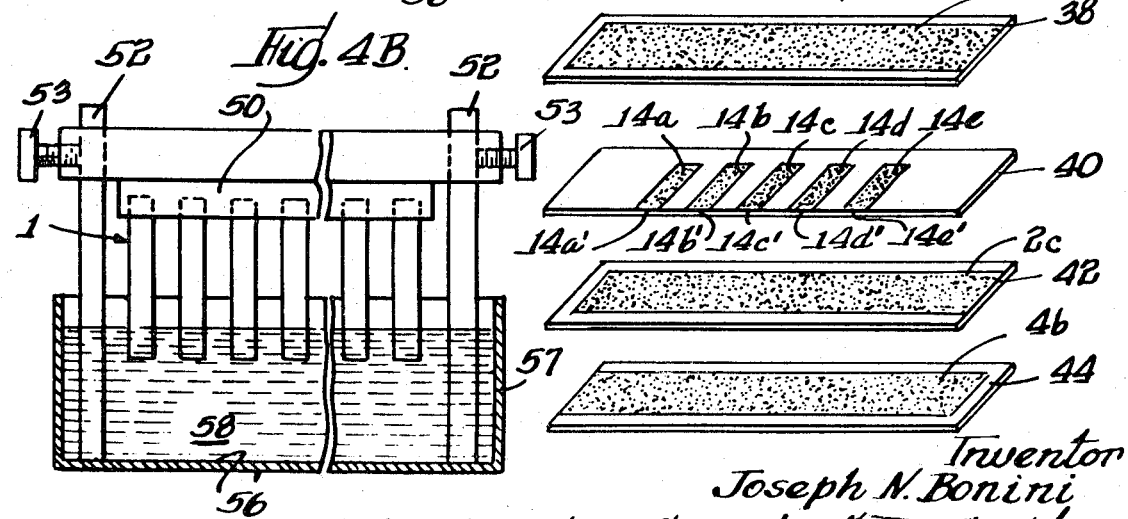
Inventor
Joseph N. Bonini

METHOD OF MAKING A TRIMMABLE MONOLITHIC CAPACITOR

This invention is a division of application Ser. No. 3,011, filed Jan. 15, 1970 now U.S. Pat. No. 3,586,933, issued June 22, 1971.

This invention relates generally to a method of making capacitors, and more particularly to a method of mass producing a monolithic capacitor body and trimming the same to an accurate fixed capacitance value during the manufacture thereof.

Monolithic ceramic capacitors are well known in the art and the techniques of their manufacture are perfected so that very small capacitors can be formed on a mass production basis. Generally, a plurality of thin sheets of raw ceramic material are provided with selected areas thereof coated with spaced rows and columns of conductive capacitor plate-forming material for a number of capacitors. The raw ceramic sheets are placed one on top of the other so the conductive coatings for each capacitor are in registry. Individual raw ceramic capacitors are cut from the resulting laminate body to form capacitors whose alternate conductive coatings extend to opposite ends thereof and whose ceramic layers are in contact along the lateral margins thereof. The raw ceramic capacitor bodies are then fired at a high temperature to vaporize the binder material of the ceramic layers and to sinter the same to form monolithic capacitors. The ends of the capacitors are coated with an electroding paste, either before or after firing, to form a pair of capacitor terminals respectively interconnecting the capacitor plate-forming coatings extending to the opposite ends of the capacitor involved.

The above described ceramic capacitors are readily manufactured within tolerances of, for example, plus or minus 10 percent. Instances where very accurate capacitance values are required, as, for example, tolerances of plus or minus 1 percent, a capacitor having a capacitance above the desired size heretofore has been trimmed to the desired size by cutting or sandblasting after it has been fired and the capacitance value thereof determined by actual measurement. The fired capacitor is brittle and cutting or sandblasting the same in many instances damages the same by causing cracking of the ceramic capacitor body. Also, sandblasting causes undesired porosity of the edge surfaces of the capacitor being trimmed, so moisture and contaminants can enter the capacitor to vary the value thereof. In addition, sandblasting a capacitor can spread the exposed edges of the capacitor plates to cause short circuits between adjacent plates in the capacitors and the trimming thereof by cutting or sandblasting requires such a great deal of time and care that the capacitor becomes very expensive to fabricate and trim.

An object of the invention is to provide an inexpensive method of making and trimming to close tolerances a monolithic ceramic capacitor of the type described.

A more specific object of the invention is to provide a method as described which does not in any way adversely affect the integrity of or damage the capacitor in any way.

A related object of the invention is to provide a simple and economical method of mass producing the above described trimmable monolithic ceramic capacitor.

The monolithic ceramic capacitor made and/or trimmed by the method of the invention is formed with one or more ceramic layers provided with a number of fine trimming plate-forming conductive coatings initially unconnected and of about the same size extending to different points on one or more of the lateral edges thereof. Each of the conductive coatings may be connected to act as a fine trimming capacitor plate by, for example, having an area which is capable of adding a small percent (e.g., one half of 1 percent) to the total capacitor plate area. One or more of the ceramic layers may also be provided with an initially unconnected rough trimming plate-forming coating extending to a lateral edge thereof and capable of adding a much greater percentage (e.g., 5 percent) to the total plate area of the capacitor. In the most preferred form of the capacitor, the various trimming plate-forming coatings extend to different longitudinally spaced points on one or more of the lateral edges of the capacitor which points are also longitudinally spaced from the end portions of the capacitor to be occupied by the end terminals of the finished capacitor.

In accordance with one aspect of the invention, after a large number of capacitors are initially fabricated in their untrimmed state (i.e., with end terminals unconnected to the trimming capacitor plate-forming coatings thereof), their capacitance values are tested after which the capacitors having capacitance values falling short of their desired value by the same respective percentages are separated out into respective groups so that each group of capacitors having capacitance values falling short of the desired value by the same percentage can be trimmed identically on a mass production basis. The capacitors in each group are trimmed to the desired value by extending one of the associated end terminals to cover the proper number of exposed edges of the trimming plate-forming coatings to provide the desired plate area. The end terminal extending operation can be most efficiently accomplished by supporting a large number of capacitors in parallel relation on a common frame and immersing the capacitors to the same degree in a body of terminal forming material, such as a body of silver paste, to cover the required number of plate-forming coating edges.

As one example of the invention, if there is a single rough trimming plate of a size to add about 5 percent of capacitance value to the capacitor and then fine trimming plates each of a size to add about one half percent to the capacitance value of the capacitor, then the range of adjustment in capacitance is 0 to 10 percent in one half percent increments, or one half to 5 percent in one half percent increments (if the exposed edge of the rough trimming plate is coated with a film of insulating material before the dipping or other terminal extending operation involved).

The above and other objects, features and advantages of the invention will be more fully realized and understood from the following detailed description when taken in conjunction with the accompanying drawings wherein like reference numerals throughout the various views of the drawings are intended to designate similar elements or components. In the drawings:

FIG. 1 is a perspective view of a trimmable monolithic capacitor to be made and trimmed in accordance with this invention;

FIG. 2 is an enlarged fragmentary sectional view of the capacitor body of FIG. 1, taken along section line 2—2 thereof;

FIG. 3 is an exploded view of the various capacitor-plate-containing layers shown in FIG. 2; and FIGS. 4A and 4B diagrammatically illustrate a method of applying coatings of conductive paste of the like, to form the terminals on capacitor bodies constructed in accordance with this invention.

Referring now to FIGS. 1, 2, and 3 there is shown a monolithic ceramic capacitor 1 made and trimmed in accordance with the method of the present invention. The capacitor 1 includes an elongated rectangular ceramic body 3 having a plurality of parallel spaced main capacitor plates 2a, 4a, 2c, 4b, etc., in the order named embedded therein. The main capacitor plates 2a, 2b, etc., form one group of main capacitor plates encompassing most of the cross section of the ceramic body but spaced from all margins but the right end thereof, as viewed in the drawings, and the main capacitor plates 4a, 4b, etc., form another group of plates encompassing most of the cross section of the ceramic body but spaced from all margins but the left end thereof. Also embedded within the capacitor body 3 are fine trimming plates 14a, 14b, 14c, 14d and 14e, most advantageously in the same plane of the body, and a rough trimming capacitor plate 15 preferably in another plane of the body, such as a plane near the outer surface of the capacitor body. As illustrated, the fine trimming plates are narrow, spaced, laterally extending plates having edges 14a', 14b', 14c', 14d' and 14e' at one lateral side of the capacitor body 3, and the rough trimming plate 15 encompasses most of the cross section of the capacitor body and is spaced from all margins of the ceramic body 3 except when it extends to a lateral side margin thereof through a narrow tab 15'' having an edge 15'. It is most advantageous (although not necessary) that the edges of the fine and rough trimming capacitor plates extend to the same or different lateral sides of the capacitor body at different longitudinally spaced points therealong.

In the finished capacitor shown in FIG. 1, a terminal-forming coating 13 extending over and around the left side portion of the capacitor body 3 interconnects the various edges of the main capacitor plates 4a, 4b, etc., extending to the left end of the capacitor body 3 and extends longitudinally along the capacitor body a sufficient distance to overlie a preselected number of the edges of the fine and rough trimming capacitor plates to trim the capacitor to the desired value. In FIG. 1 the terminal-forming coating 13 extends over the edge 15 of the tab 15'' of the rough trimming plate 15 and the edges 14a', 14b', 14c' and 14d' of the fine trimming plates 14a, 14b, 14c, 14d, leaving exposed and unconnected the edge 14e' of the fine trimming plate 14e. The edges of the group of main capacitor plates 2a, 2b, etc., extending to the right end of the capacitor body 3 are interconnected and covered by a narrow terminal-forming coating 14 which is spaced and insulated from the first mentioned terminal-forming coating 13.

The ceramic body 3 most advantageously comprises a plurality of sintered together ceramic layers of a suitable dielectric-forming material such as barium titanate. As seen in FIGS. 2 and 3, the ceramic layers shown therein include layers 30, 32, 34, 36, 38, 40, 42, 44, etc. The rough trimming plate 15 is a deposited coating of conductive material like platinum on the second ceramic layer 32. The fine trimming plates 14a, 14b, 14c, 14d, and 14 are shown as relatively narrow deposits of conductive material on one of the intermediate ceramic layers 40, each of the deposits or coatings occupying a small fraction of the length of the layer involved and extending to the same lateral margin of the layer 40 to form the aforesaid edges 14a', 14b', 14c', 14d' and 14e' of the fine trimming plates. As illustrated, the edge 15' of the rough trimming plate 15 occupies a different longitudinal segment of the capacitor body 3 than the edges 14a', 14b', 14c', 14d' and 14e' of the fine trimming plates.

The group of main capacitor plates 4a, 4b, etc., extending to the left end of the ceramic body 3 are deposits of conductive material on various ceramic layers 36, 44, etc. Similarly, the other group of main capacitor plates 2a, 2b, 2c, etc., are deposits of conductive material on ceramic layers 34, 38, 42, etc. Upper and lower layers of ceramic material (only the uppermost ceramic layer 30 being visible in FIGS. 2 and 3) respectively overlie and underlie the uppermost and lowermost coated ceramic layers.

As is conventional in the manufacture of monolithic ceramic capacitors, the various conductive coatings are initially applied on large raw ceramic sheets of ceramic material by squeegeeing a slurry of conductive material thereon through a silk screen or other mask, each sheet containing coatings for a number of different capacitors. These coated sheets are then dried and stacked to form a large laminate body from which individual raw ceramic capacitor bodies are cut, with the edge portions of the various coatings extending to various edges of the resulting capacitor bodies. After the ceramic capacitor bodies are fired and before the terminal-forming coating 13 is applied or extended to cover the edges of the trimming plates, the capacitance values of the various capacitor bodies involved are measured using conventional capacitor measuring techniques and apparatus to determine the untrimmed values of the various capacitors.

After such measurement the capacitor bodies are separated into various groups where the capacitor bodies in each group have a capacitance value less than the desired rated capacitance value by roughly the same percentage, so that the capacitor bodies in each group can be similarly trimmed utilizing the present invention on a mass production basis by applying and/or extending the terminal-forming coating to overlie and connected the proper number of trimming plates. Although, the terminal-forming coatings 13 could be hand painted on the capacitor bodies one at a time, it is best done on a mass production basis in a manner like that shown in FIGS. 4A or 4B.

It will be assumed that the rough trimming plate can add 5 percent and each fine trimming plate 14a, 14b, 14, etc., can add one-half percent of the capacitance of each untrimmed capacitor body. Thus, for example, if the capacitors in a given group differ from the desired value by a percentage of, for example 7 percent, rough trimming plate 15 and fine trimming plates 14a, 14b, 14c and 14d must be connected to the terminal forming coating 13. The capacitors 1 may be supported in a depending position from a suitable clamping frame 50 with the ends thereof to contain the terminal-forming coatings 13 at the bottom of the capacitors and in the same horizontal plane. The clamping frame 50 illustrated is supported for vertical adjustment along a pair of vertical bars 52—52 by loosening and then tightening clamping screws 53—53. The bars 52—52 are adapted to rest on the bottom 56 of an open-top tray 57 containing a body 58 of terminal-forming material, such as a slurry of silver or the like. The spacing of the common plane at the bottom of the various capacitors 1 supported from the clamping frame 50 and the bottom of the bars 52—52 is such that when the bars 52—52 are placed on the bottom of the tray 58, the body of silver 58 or the like will cover over the edges 15' of the rough trimming plates 15 and a number of the edges 14a', 14b', etc., of the fine trimming plate to raise the capacitive value to the desired amount. Thus, in the example being described where it is desired to increase the capacitance value by 7 percent, the spacing referred to is such that placing the bars 52—52 on the bottom of the tray 56 will cause the trimming plate edges 15', 14a', 14b', 14c' and 14d' to be coated with silver, thereby electrically connecting the trimming plates involved to the various main capacitor plates extending to the end of the capacitor body containing the terminal-forming coating 13.

FIG. 4B illustrates an adjustment of the clamping frame 50 on the bar 52—52 which, when the rods are placed on the bottom of the tray, will cover the edges 15' of the rough trim plate 15 and the edge 14a' of the fine trim plate 14a to add 5-½ percent capacitance to the various capacitors 1 shown.

The illustrated embodiment of the invention thus provides a method of trimming the same wherein small increments of capacitance can be easily added on a mass production basis to the capacitor bodies without causing defects therein, and wherein the trimming adjustments can be made quickly and easily with a minimum of expense and time.

It will be understood that variations and modifications of this invention may be made without departing from the spirit and scope of the novel concepts disclosed and claimed herein.

I claim:

1. A method of making and trimming a capacitor comprising the steps of: forming a capacitor having an insulating body with a plurality of capacitor forming plates therein forming two groups of capacitor plates with edge portions of one group of plates extending to a margin of the body and interconnected by a terminal and edge portions of the other group of plates extending to a margin of the body and interconnected by another terminal, and trimming plates in said body opposite one or more plates of said one group of plates and having edge portions extending to a margin of the body, in alignment therealong, and spaced and insulated from one another and said terminals, each trimming plate when connected to the terminal of said other group of plates adding a small given increment to the value of the overall capacitance of the capacitor; measuring the capacitance between said terminals and, if the capacitance is less than the desired value by an amount which can be added by said trimming plates; extending the terminal of said other group of plates to contact physically and electrically said edge portions of a number of said trimming plates necessary to obtain the desired capacitance value.

2. A method of mass producing and trimming capacitors of a given capacitance value comprising: forming a large number of capacitors each comprising an insulating body with a plurality of capacitor forming plates therein; forming two groups of capacitor plates with edge portions of one group of plates extending to one end margin of the body and interconnected by a terminal and edge portions of the other group of plates extending to another margin of the body and interconnected by another terminal, and trimming plates in said body opposite one of more plates of one of said group of plates and having edge portions extending to one or more side margins at longitudinally spaced points therealong; measuring the capacitance of each capacitor between the terminals thereof and separating the capacitors into various groups of capacitors where the measured capacitance values of the receiving capacitors in each group is less than the desired value by the same incremental amount which can be added by connecting the same number of said trimming plates to the said other group of plates; and then simultaneously trimming a number of capacitors in each separated group of capacitors by simultaneously extending the terminal of said other group of plates of each capacitor involved to contact physically and electrically said edge portions of a number of said trimming plates necessary to obtain the desired capacitance value.

3. The method of claim 2 wherein said simultaneously trimmed capacitors in each separated group of capacitors are similarly supported in a depending position on a common frame with said one end thereof at the bottom of the capacitors in a common horizontal plane, and said terminal extending step comprising simultaneously dipping the frame supported capacitors to the same depth in a liquid body of conductive terminal-forming material to coat the capacitor body longitudinally with such material to the extent necessary to overlie the edge portions of the proper number of trimming plates to achieve the desired capacitance value.

* * * * *